Patented Aug. 17, 1926.

1,596,588

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR TREATING WATER IN OIL EMULSIONS.

No Drawing.   Application filed December 23, 1924.   Serial No. 757,738.

This invention relates to the treatment of emulsions of mineral oil and water, such as petroleum emulsions, for the purpose of separating the oil from the water.

Petroleum emulsions of the kind referred to are commonly known as "cut oil", "roily oil" and "bottom settlings", and consist of oil constituting the continuous phase of the emulsion, droplets of water distributed throughout the body of water and constituting the dispersed phase, and films of matter that encase the droplets of water.

The object of my invention is to provide a process for treating petroleum emulsions that is similar to the process described in the United States patent to Barnickel, No. 1,223,659, dated April 24, 1917, in that it consists in subjecting the emulsion to the action of an agent that reacts with the hard water salts, but which is distinguished from said Barnickel patent, in that the substance used as the treating agent is derived from an entirely new source and is therefore a specifically different treating agent from those enumerated in said patent.

Briefly stated, my process consists in treating a petroleum emulsion, in the conventional manner, with a substance derived from the rectification of the by-products obtained in the destructive distillation of shale and allied products. The treating substance that I prefer to use is a water soluble soap obtained from a neutral, acid or alkali shale oil sludge, which may or may not have been previously sulphonated. One method that can be employed to produce soluble soap of the kind above referred to is as follows:

Shale is subjected to destructive distillation by means of any suitable retort, so as to evolve gaseous vapor carrying certain materials susceptible of being condensed into liquid form. This gas is passed through condensers and the liquid material consisting essentially of shale tar oils and shale tar is condensed. The gas is passed into the distributing system. This mixture of crude shale oil tar is distilled so as to separate the lighter oils from the heavy tars. These light oils are then rectified with strong sulphuric acid so that a sulphuric acid sludge separates out. After this separation they are subjected to a strong alkaline mixture, and subsequently, an alkali sludge separates out. The oil thus obtained is brought to the neutral point and held in storage with the ultimate precipitation of a third or neutral sludge. The oil is finally drawn off from its neutral sludge and redistilled so as to give gasoline, lubricating oils, etc. Usually, the neutral sludge and alkali sludge can be used for breaking water-in-oil emulsions, although at times it is necessary to add more alkali or else to sulphonate this sludge with stronger sulphuric acid, such as commercial oleum, and subsequently, separate from the excess acid and make soluble by means of an alkali. The acid sludge is usually made neutral with caustic soda and then treated substantially as the original neutral sludge.

A soap of the kind mentioned is inexpensive enough to permit it to be used successfully in competition with modified fatty acids and other highly active treating agents; it does not show the characteristic free mineral acid, as in the case of soaps derived from petroleum sludge; it can be shipped in metal containers, due to the fact that it is not acid in character; it is of uniform character, owing to the fact that the usual custom is to erect a shale oil plant adjacent a bed of shale of sufficient size to insure a uniform source of supply of raw material for the plant for many years, and it does not require pretreatment with an alkali solution of either soda ash or caustic soda, as is necessary with a reagent obtained from petroleum sludge. The reason for such pretreatment in the soaps derived from petroleum sludge is that soap is the soluble salt of a sulphonated petroleum acid. This sulphonated petroleum acid can react with alkali in its carboxyl radical just as an ordinary fatty acid, and it can react with the sulphonated acid radical just as sulphuric acid. When such soaps are ordinarily prepared they are neutral or slightly alkaline. However, after standing some time, the sulphonic group hydrolyzes and produces additional sulphuric and sulphurous acid. As a result of this hydrolysis or secondary reaction, it has long been customary to add additional alkali to the salts of the petroleum sulphonated acids before employing them in contact with the metallic part of the oil well.

Having thus described my invention, what I claim as new and desire to secure by Letters Patent is:

1. A process for treating petroleum emulsions, characterized by subjecting the emulsion to the action of a water soluble, saponaceous substance derived from the rectification of the liquid water insoluble by-products obtained in the destructive distillation of shale.

2. A process for treating petroleum emulsions, characterized by subjecting the emulsion to the action of a water soluble saponaceous substance derived from the rectification of the liquid, water insoluble by-products obtained in the destructive distillation of shale and having the essential characteristics of a water softening agent.

3. A process for treating petroleum emulsions, characterized by subjecting the emulsion to the action of a water soluble soap obtained from a shale oil sludge.

4. A process for treating petroleum emulsions, characterized by subjecting the emulsion to the action of a water soluble soap obtained from a sulphonated shale oil sludge.

MELVIN DE GROOTE.